United States Patent
Li et al.

(10) Patent No.: US 11,399,330 B2
(45) Date of Patent: Jul. 26, 2022

(54) ROUTING SELECTION METHOD, APPARATUS, DEVICE AND SYSTEM, AND STORAGE MEDIUM

(71) Applicant: ZTE Corporation, Guangdong (CN)

(72) Inventors: Dapeng Li, Shenzhen (CN); Yin Gao, Shenzhen (CN); Jinguo Zhu, Shenzhen (CN); Shuang Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 66 days.

(21) Appl. No.: 16/989,755

(22) Filed: Aug. 10, 2020

(65) Prior Publication Data

US 2021/0068030 A1    Mar. 4, 2021

Related U.S. Application Data

(63) Continuation of application No. PCT/CN2019/072460, filed on Jan. 21, 2019.

(30) Foreign Application Priority Data

Feb. 12, 2018 (CN) .......................... 201810147305.3

(51) Int. Cl.
*H04W 40/02* (2009.01)
*H04W 8/02* (2009.01)
*H04W 48/16* (2009.01)

(52) U.S. Cl.
CPC ............. *H04W 40/02* (2013.01); *H04W 8/02* (2013.01); *H04W 48/16* (2013.01)

(58) Field of Classification Search
CPC ....... H04W 40/02; H04W 8/02; H04W 48/16; H04W 40/246; H04W 40/34; H04W 76/22; H04W 40/248; H04L 45/02; H04L 45/74
See application file for complete search history.

(56) References Cited

U.S. PATENT DOCUMENTS

| | | | |
|---|---|---|---|
| 8,693,470 B1 | 4/2014 | Maxwell et al. | |
| 2020/0163009 A1* | 5/2020 | Chen | H04W 76/10 |
| 2021/0289341 A1* | 9/2021 | Hans | H04W 76/50 |

FOREIGN PATENT DOCUMENTS

| | | |
|---|---|---|
| CN | 101083830 A | 12/2007 |
| CN | 103781182 A | 5/2014 |
| CN | 106954233 A | 7/2017 |

OTHER PUBLICATIONS

International Search Report for PCT Appl. No. PCT/CN2019/072460 dated Apr. 8, 2019 (with English translation, 5 pages).

(Continued)

*Primary Examiner* — Marisol Figueroa
(74) *Attorney, Agent, or Firm* — Foley & Lardner LLP

(57) ABSTRACT

A routing selection method, apparatus, device and system and a storage medium are provided. The method includes receiving a route reassignment message sent by a serving core network device. The route reassignment message includes at least one of at least one of identification information or address information of an initial core network device; at least one of identification information or address information of the serving core network device; a context identifier assigned for a served object in at least one of the initial core network device, the access network device or the serving core network device; network slice information supported by the served object; or operator information supported by the served object.

12 Claims, 6 Drawing Sheets

(56) References Cited

OTHER PUBLICATIONS

Extended European Search Report for EP Appl. No 19751585.1, dated Oct. 20, 2021 (8 pages).
Huawei et al.: "TS 23.501: Routing NSSAI to perform AMF selection by (R)AN" SA WG2 Meeting #122; S2-174340; San Jose Del Cabo, Mexico; Jun. 30, 2017 (5 pages).
Huawei: "Clarification on Allowed Nssai" 3GPP TSG-RAN WG3 #97bis Meeting; R3-173898; Prague, Czech; Oct. 13, 2017 (5 pages).

* cited by examiner

ROUTING SELECTION METHOD, APPARATUS, DEVICE AND SYSTEM, AND STORAGE MEDIUM

CROSS-REFERENCE TO RELATED APPLICATIONS

This application claims the benefit of priority under 35 U.S.C. § 120 as a continuation of PCT Patent Application No. PCT/CN2019/072460, filed on Jan. 21, 2019, which claims priority to Chinese patent application No. 201810147305.3, filed on Feb. 12, 2018, the disclosure of each of which is incorporated herein by reference in its entirety.

This application claims priority to Chinese patent application No. 201810147305.3 filed with the Patent Office of the People's Republic of China on Feb. 12, 2018, disclosure of which is incorporated herein by reference in its entirety.

TECHNICAL FIELD

The present application relates to the field of communications, for example, to a routing selection method, apparatus, device and system and a storage medium.

BACKGROUND

A future mobile network not only provides communication between people, but also provides services for a mass of devices of the Internet of Things (IoT), for example, services with ultra-high-rate service requirements such as virtual reality and high-definition videos, where the rate of such services needs to reach 10 to 100 times the current rate; and services with low-latency service requirements such as the Internet of Vehicles, where the end-to-end latency needs to be shortened by 5 times. For another example, the Internet of Things needs to be connected to 1000 times the number of current services, and the battery life needs to be extended to 10 times the current battery life.

FIG. 1 is a schematic diagram showing a communication architecture of a fifth-generation mobile communication (5-Generation, 5G) technology according to 3rd Generation Partnership Project (3GPP) TS 38.300. As shown in FIG. 1, the 5G communication architecture includes a 5G core network (5GC) and a 5G access network. The network elements of the 5G core network include access and mobility management functions (AMFs) and user plane functions (UPFs) in FIG. 1. The network elements of the 5G access network include 4G base stations (e.g. ng-eNBs) or 5G base stations (e.g. gNBs). The interface between a network element of the core network and a network element of the access network is an NG interface. The interface between the network elements of the access network is an Xn interface.

FIG. 2 is an abstract 5G network element structure. Each mobile communication system, including the 5G communication architecture shown in FIG. 1, has a deployment scenario in which one network element is simultaneously connected to two network elements. For example, a second network element is simultaneously connected to a first network element and a third network element. The first network element and the third network element may be, for example, AMF devices of a 5G core network, and the second network element may be, for example, an access device such as a gNB device.

In FIG. 2, the second network element provides a communication service to a served object in conjunction with the first network element, or the second network element provides a communication service to a served object in conjunction with the third network element. The communication service means that the data packet to be sent as required by the served object is forwarded to the first network element through the second network element and then sent to a device that needs to receive the data packet, or is forwarded to the third network element through the second network element and then sent to the device that needs to receive the data packet.

FIG. 3 is a flowchart of forwarding a data packet. As shown in FIG. 3, in steps S1 to S6, a served object sends the data packet to a second network element. The second network element establishes a communication routing context and sends the data packet of the served object to a third network element. If the third network element is not most suitable for processing the packet, the third network element may send the packet to the first network element, and then the first network element sends the packet to a target device. In steps S7 and S8, when the served object resends the data packet to the second network element, the second network element repeats the preceding steps to send the packet to the third network element, the third network element makes a determination and then sends the packet to the first network element according to the determination result, and then the first network element sends the packet to the target device. That is, each time the served object sends the data packet to the second network element, the preceding steps 2 to 6 are repeated. As a result, the communication service is inefficient.

SUMMARY

The following is an overview of the subject matter described in detail herein. This summary is not intended to limit the scope of the claims.

Embodiments of the present application provide a routing selection method, apparatus, device and system and a storage medium to avoid inefficient communication services in a 5G communication architecture.

In a first aspect, the present application provides a routing selection method applied to an access network device. The method includes receiving a route reassignment message sent by a serving core network device. The route reassignment message includes at least one of at least one of identification information or address information of an initial core network device; at least one of identification information or address information of the serving core network device; a context identifier assigned for a served object in at least one of the initial core network device, the access network device or the serving core network device; network slice information supported by the served object; or operator information supported by the served object.

In a second aspect, the present application further provides a routing selection apparatus. The apparatus includes a receiving module, which is configured to receive a route reassignment message sent by a serving core network device. The route reassignment message includes at least one of at least one of identification information or address information of an initial core network device; at least one of identification information or address information of the serving core network device; a context identifier assigned for a served object in at least one of the initial core network device, the access network device or the serving core network device; network slice information supported by the served object; or operator information supported by the served object.

In a third aspect, the present application further provides a routing device including the routing selection apparatus.

In a fourth aspect, the present application further provides a routing system. The system includes a serving core network device and an access network device. The serving core network device is configured to send a route reassignment message to the access network device. The route reassignment message includes at least one of at least one of identification information or address information of an initial core network device; at least one of identification information or address information of the serving core network device; at least one of identification information or address information of the serving core network device; network slice information supported by the served object; or operator information supported by the served object. The access network device is configured to update routing information of a communication context of a terminal according to the route reassignment message.

In a fifth aspect, the present application further provides a storage medium configured to store a routing program. When the program is executed, the following operation is performed: receiving a route reassignment message sent by a serving core network device. The route reassignment message includes at least one of at least one of identification information or address information of an initial core network device; at least one of identification information or address information of the serving core network device; a context identifier assigned for a served object in at least one of the initial core network device, the access network device or the serving core network device; network slice information supported by the served object; or operator information supported by the served object.

Other aspects can be understood after the accompanying drawings and detailed description are read and understood.

DETAILED DESCRIPTION

Embodiments of the present application will be described in conjunction with drawings from which solutions of the present application will be more apparent.

Figure 1:
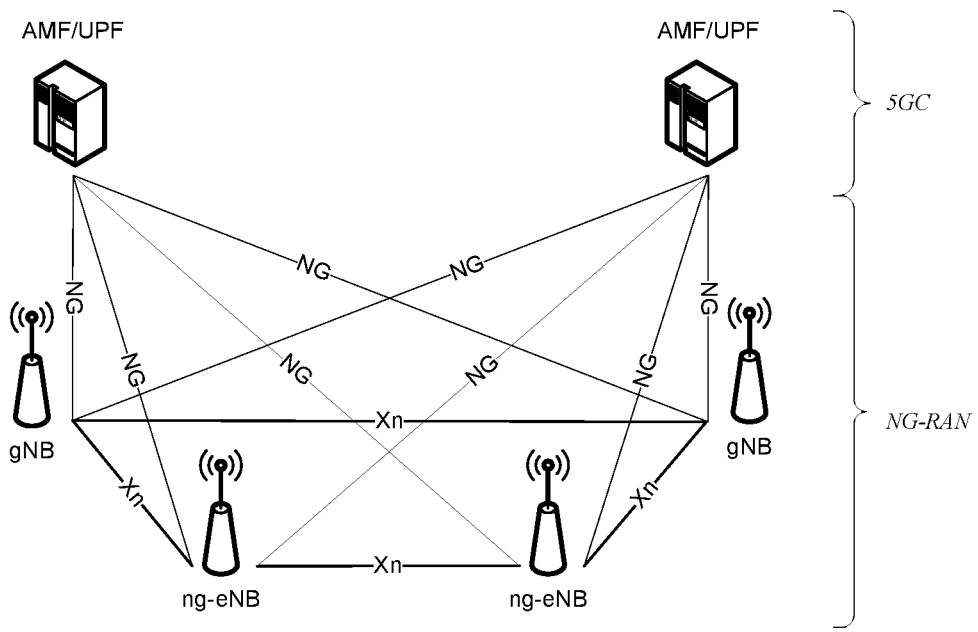
FIG. 1 is a schematic diagram showing a 5G communication architecture according to 3GPP TS 38.300.
Figure 2:
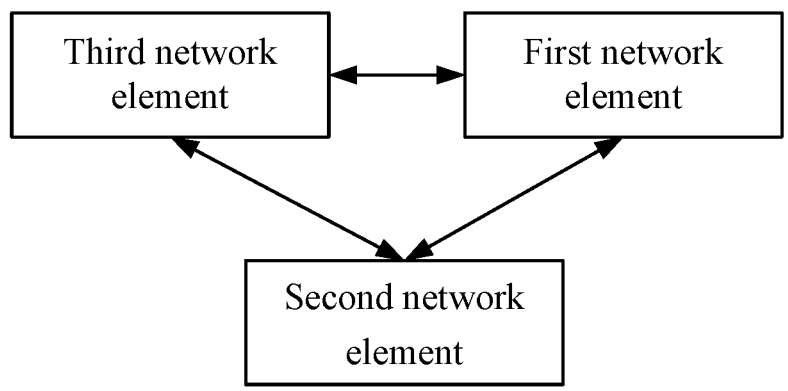
FIG. 2 is a schematic diagram of an abstract 5G network element structure.
Figure 3:
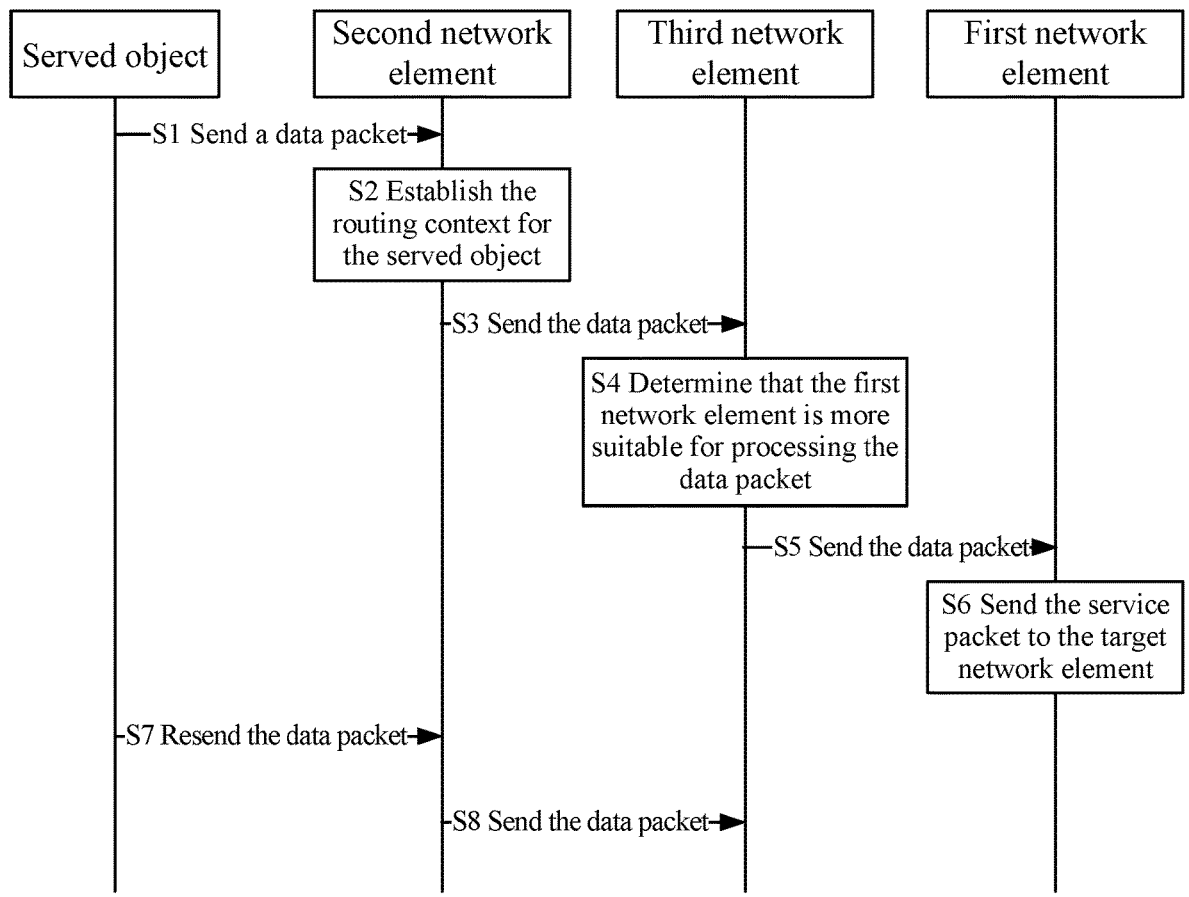
FIG. 3 is a flowchart of forwarding a data packet.
Figure 4:
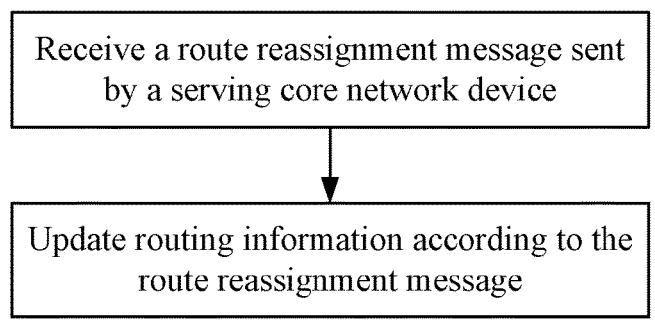
FIG. 4 is a flowchart of a routing selection method according to an embodiment of the present application.

As shown in FIG. 4, an embodiment of the present application provides a routing selection method applied to an access network device. The method includes receiving a route reassignment message sent by a serving core network device.

In this embodiment of the present application, after receiving the route reassignment message sent by the serving core network device, the access network device may update routing information of a communication context of a terminal according to the route reassignment message.

In this embodiment of the present application, after the serving core network device receives a communication packet forwarded by an initial core network device, the serving core network device sends the route reassignment message to the access network device, and the access network device may update the routing information of communication context of the terminal according to the route reassignment message by using a routing function. Therefore, when receiving the subsequent communication packet sent by the served object, the access network device may send the subsequent communication packet to the serving core network device according to the updated routing information, thereby improving the communication service efficiency by route configuration update.

The serving core network device and the initial core network device may be network elements of a 4G core network, such as Mobility Management Entities (MMEs), or network elements of a 5G core network, such as AMFs.

The access network device may be a network element of an access network, such as a base station like a 4G base station (ng-eNB), a 5G base station (eNB) or gNB-CU.

In this embodiment of the present application, the route reassignment message sent by the serving core network device to the access network device may be an interface message defined by a standard, such as an NG interface message of 5G or an S1 interface message of 4G The route reassignment message may be a new message or may reuse a related message such as a Downlink Network Attached Storage Transfer (Downlink NAS Transfer) message or an initial UE context message.

In this embodiment of the present application, the route reassignment message includes at least one of at least one of identification information or address information of an initial core network device; at least one of identification information or address information of the serving core network device; a context identifier assigned for a served object in at least one of the initial core network device, the access network device or the serving core network device; network slice information supported by the served object; or operator information supported by the served object.

In this embodiment of the present application, the method further includes that the access network device sends a reassignment response message to the serving core network device.

In this embodiment of the present application, after the access network device updates the routing information of the communication context of the terminal by using the routing function, the serving core network device sends a reassignment response message to the initial core network device. The reassignment response message is used for notifying the serving core network device that the access network device has successfully updated routing, so that the serving core network device can continue to implement the authentication process of the terminal. If the serving core network device is notified that the routing update fails, it is not needed for the serving core network device to implement the subsequent authentication process.

In this embodiment of the present application, the reassignment response message includes at least one of the at least one of the identification information or the address information of the initial core network device; the at least one of the identification information or the address information of the serving core network device; the context identifier assigned for the served object and at the at least one of the initial core network device, the access network device or the serving core network device; the network slice information supported by the served object; the operator information supported by the served object; a routing information modification indication or a routing information modification failure indication; or a routing failure reason.

The identification information of the initial core network device includes at least one of an access and mobility management function (AMF) identifier of the initial core network device or AMF pool information of the initial core network device.

The identification information of the serving core network device includes at least one of an AMF identifier of the serving core network device or AMF pool information of the serving core network device.

The address information of the initial core network device includes an Internet Protocol (IP) address of the initial core network device or Stream Control Transmission Protocol (SCTP) coupling information of the initial core network device.

The address information of the serving core network device includes SCTP coupling information of the serving core network device or an IP address of the serving core network device.

The assigned context identification for the communication context includes an index number RAN UE NGAP ID assigned by a base station and an index number AMF UE NGAP ID assigned by a core network.

The network slice information includes one of preconfigured network slice information; or allowed slice information determined after the initial core network device or the serving core network device checks network slice information requested by a terminal.

In this embodiment of the present application, the network slice information may be an S-NSSAI list or allowed Network Slice Selection Assistance Information (allowed NSSAI). The network slice information is terminal-related network slice information. The network slice information may be a configured NSSAI for the terminal. The network slice information may be allowed NSSAI after the initial core network device checks network slice information requested by the terminal or allowed NSSAI after the serving core network device checks network slice information requested by the terminal.

The operator information refers to, for example, a Public Land Mobile Network (PLMN). Different operators may configure different routing information. If the configuration of the route reassignment information includes the operator information and different operators have different configurations, for example, the network slice information of operator 1 and the network slice information of operator 2 are different, then the access network device updates the routing configuration of each operator separately when performing the routing update.

In this embodiment of the present application, the access network device receives the route reassignment message sent by the serving core network device. When receiving the communication packet sent by the served object, the access network device performs routing according to the route reassignment message and sends the communication packet to the serving core network device.

Figure 5:
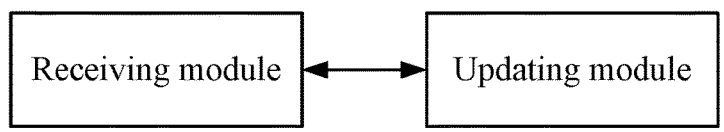
FIG. 5 is a structure diagram of a routing selection apparatus according to an embodiment of the present application.

As shown in FIG. 5, an embodiment of the present application further provides a routing selection apparatus including a receiving module.

The receiving module is configured to receive a route reassignment message sent by a serving core network device. The route reassignment message includes at least one of at least one of identification information or address information of an initial core network device; at least one of identification information or address information of the serving core network device; a context identifier assigned for a served object in at least one of the initial core network device, the access network device or the serving core network device; network slice information supported by the served object; or operator information supported by the served object.

In this embodiment of the present application, the apparatus further includes an update module.

The update module is configured to update routing information of a communication context of a terminal according to the route reassignment message.

In this embodiment of the present application, the apparatus further includes a feedback module.

The feedback module is configured to send a reassignment response message to the serving core network device. The reassignment response message includes at least one of the at least one of the identification information or the address information of the initial core network device; the at least one of the identification information or the address information of the serving core network device; the context identifier assigned for the served object and at the at least one of the initial core network device, the access network device or the serving core network device; the network slice information supported by the served object; the operator information supported by the served object; a routing information modification indication or a routing information modification failure indication; or a routing failure reason.

An embodiment of the present application further provides a routing device including the routing selection apparatus.

Figure 6:
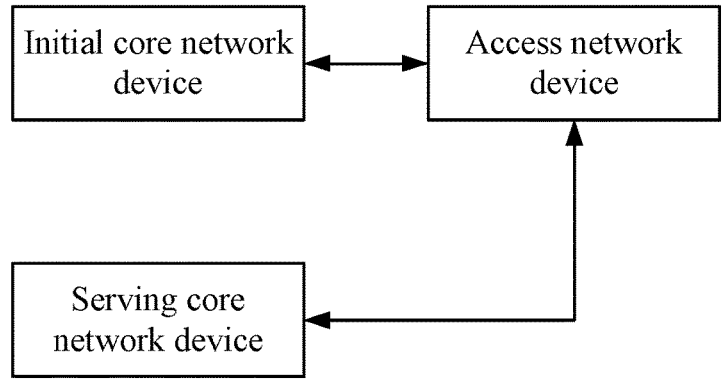
FIG. 6 is a structure diagram of a routing system according to an embodiment of the present application.

As shown in FIG. 6, an embodiment of the present application further provides a routing system including a serving core network device and an access network device.

The serving core network device sends a route reassignment message to the access network device. The route reassignment message includes at least one of at least one of identification information or address information of an initial core network device; at least one of identification information or address information of the serving core network device; a context identifier assigned for a served object in at least one of the initial core network device, the access network device or the serving core network device; network slice information supported by the served object; or operator information supported by the served object.

The access network device updates routing information of a communication context of a terminal according to the route reassignment message.

In this embodiment of the present application, the access network device sends a reassignment response message to the serving core network device. The reassignment response message includes at least one of the at least one of the identification information or the address information of the initial core network device; the at least one of the identification information or the address information of the serving core network device; the context identifier assigned for the served object and at the at least one of the initial core network device, the access network device or the serving core network device; the network slice information supported by the served object; the operator information supported by the served object; a routing information modification indication or a routing information modification failure indication; or a routing failure reason.

An embodiment of the present application further provides a storage medium configured to store a routing program. When the program is executed, the following operation is performed: receiving a route reassignment message sent by a serving core network device. The route reassignment message includes at least one of at least one of identification information or address information of an initial core network device; at least one of identification information or address information of the serving core network device; a context identifier assigned for a served object in at least one of the initial core network device, the access network device or the serving core network device; network slice information supported by the served object; or operator information supported by the served object.

Example One

Figure 7:
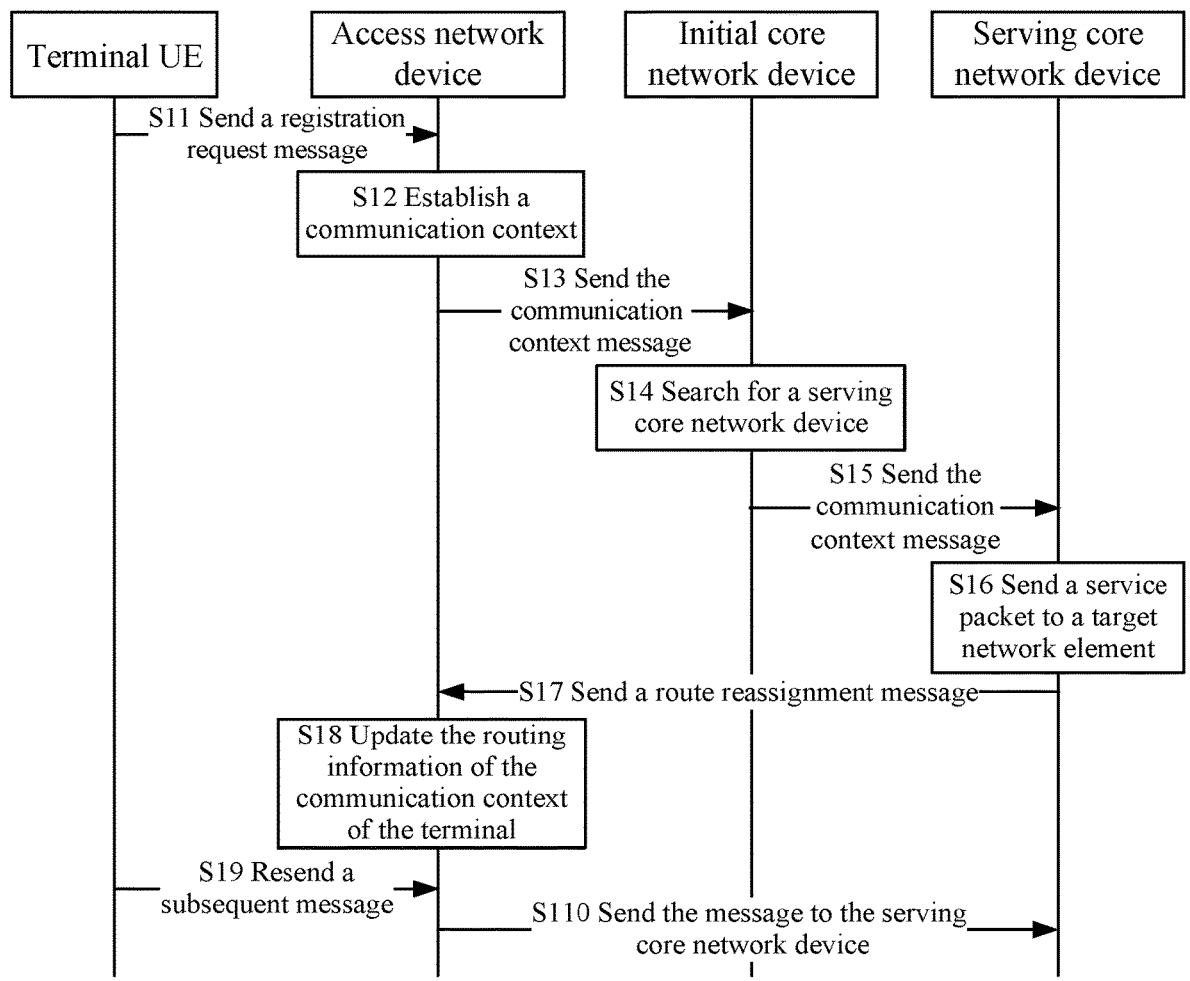
FIG. 7 is a flowchart of a routing selection method according to embodiment one of the present application.

With reference to FIG. 7, a routing selection method includes steps S11 to S19 and step S110.

In step S11, a user equipment (UE) sends a registration request message to a base station.

In step S12, the base station establishes a communication context.

In step S13, the base station sends the communication context message to an initial core network device.

In step S14, the initial core network device searches for a serving access device.

In step S15, the initial core network device sends the communication context message to the serving core network device.

In step S16, the serving core network device sends a service packet to a target network element.

In step S17, the serving core network device sends a route reassignment message to the base station.

The message sent by the serving core network device to the base station is an interface message defined by a standard, such as an NG interface message of 5G or an S1 interface message of 4G The route reassignment message may be a new message such as a reassignment message. Alternatively, the route reassignment message may reuse a related message such as a Downlink RAN Configuration Transfer message.

The route reassignment message includes route reassignment information. The route reassignment information is one or a combination of the identifier (AMF name) of the initial core network device or the AMF pool information of the initial core network device; the identifier (AMF name) of the serving core network device or the AMF pool information of the serving core network device; the address information of the initial core network device, for example, an SCTP coupling address or an IP address for connection to the base station; the address information of the serving core network device, for example, an SCTP coupling address or an IP address for connection to the base station; the context identifier of the UE at the initial core network device, for example, initial AMF UE NGAP ID; the context identifier of the UE at the serving core network device, for example, serving AMF UE NGAP ID; the context identifier assigned by the base station to the UE, for example, RAN UE NGAP ID; network slice information, for example, S-NSSAI list and/or allowed NSSAI; or operator information, for example, PLMN information.

In step S18, the base station updates the routing information of the communication context of the terminal.

The base station receives the route reassignment information sent by the serving core network device and performs operations in cases one to five described below.

Case one: the base station receives one of the items described below.

1. The context identifier assigned by the base station to the UE, for example, RAN UE NGAP ID; 2. The identifier (AMF name) of the initial core network device or the AMF pool information of the initial core network device; 3. The identifier (AMF name) of the serving core network device or the AMF pool information of the serving core network device.

The base station first retrieves the communication context of the UE at the base station through the RAN UE NGAP ID; and the base station updates the identifier of the core network device in the communication context of the UE to the identifier (AMF name) of the serving core network device or the AMF pool information of the serving core network device.

In an embodiment, the base station may first check whether the identifier (AMF name) of the initial core network device or the AMF pool information of the initial core network device is consistent with the information previously stored in the communication context of the UE, and abandon this modification if the identifier (AMF name) of the initial core network device or the AMF pool information of the initial core network device is inconsistent with the information previously stored in the communication context of the UE.

Case two: the base station receives one of the items described below.

1. The context identifier assigned by the base station to the UE, for example, RAN UE NGAP ID; 2. The address information of the initial core network device, for example, an SCTP coupling address or an IP address for connection to the base station; 3. The address information of the serving core network device, for example, an SCTP coupling address or an IP address for connection to the base station.

The base station first retrieves the communication context of the UE at the base station through the RAN UE NGAP ID; and the base station updates the address information of the core network device in the communication context of the UE to the address information of the serving core network device, for example, an SCTP coupling address or an IP address for connection to the base station.

In an embodiment, the base station may first check whether the address information of the initial core network is consistent with the information previously stored in the communication context of the UE, and abandon this modification if the address information of the initial core network is inconsistent with the information previously stored in the communication context of the UE.

Case three: the base station receives one of the items described below.

1. The context identifier assigned by the base station to the UE, for example, RAN UE NGAP ID; 2. The context identifier of the UE at the initial core network device, for example, initial AMF UE NGAP ID; 3. The context identifier of the UE at the serving core network device, for example, serving AMF UE NGAP ID.

The base station first retrieves the communication context of the UE at the base station through the RAN UE NGAP ID; and the base station modifies the identifier of the UE at the core network device in the communication context of the UE to the context identifier of the UE at the serving core network device, for example, serving AMF UE NGAP ID.

In an embodiment, the base station may first check whether the context identifier of the UE at the initial core network device is consistent with the information previously stored in the communication context of the UE, and abandon this modification if the context identifier of the UE at the initial core network device is inconsistent with the information previously stored in the communication context of the UE.

Case four: the base station receives one of the items described below.

1. The context identifier assigned by the base station to the UE, for example, RAN UE NGAP ID; 2. network slice information, for example, S-NSSAI list and/or allowed NSSAI The base station first retrieves the communication context of the UE at the base station through the RAN UE NGAP ID, and then selects another core network for the UE according to the network slice information. The network element in this core network is not necessarily the network element in the serving core network or the initial core network shown in FIG. 4.

Case five: the base station receives one of the items described below.

1. The context identifier assigned by the base station to the UE, for example, RAN UE NGAP ID; 2. Operator information, for example, PLMN information; 3. Other information of the route reassignment information, for example, AMF name.

The base station first retrieves the communication context of the UE at the base station through the RAN UE NGAP ID.

The base station may check whether the network slice, for example, the AMF name, is consistent with the information previously stored in the communication context of the UE, and abandon this modification if the network slice, for example, the AMF name, is inconsistent with the information previously stored in the communication context of the UE.

For case one to case four, separate processing according to the configured case of each operator is needed. Different operators may have different network configurations. In case five, when the information received by the base station is the context identifier assigned by the base station to the UE or other information of the route reassignment information, for example, network slice information, it is also needed to perform separate processing according to different operator PLMNs. This is because different operators may have different configurations.

In case five, for example, the network slice information under the PLMN1 and the network slice information under the PLMN2 are configured, and the two pieces of network slice information belong to different operators, so different pieces of routing information of different operators are updated.

In step S19, the terminal resends a subsequent message to the base station.

For example, the UE sends a NAS message service request after registration is completed.

In step S110, the base station sends the message to the serving core network device.

The message is sent to a core network that is truly serviceable and not necessarily to the initial core network device.

Example Two

Figure 8:
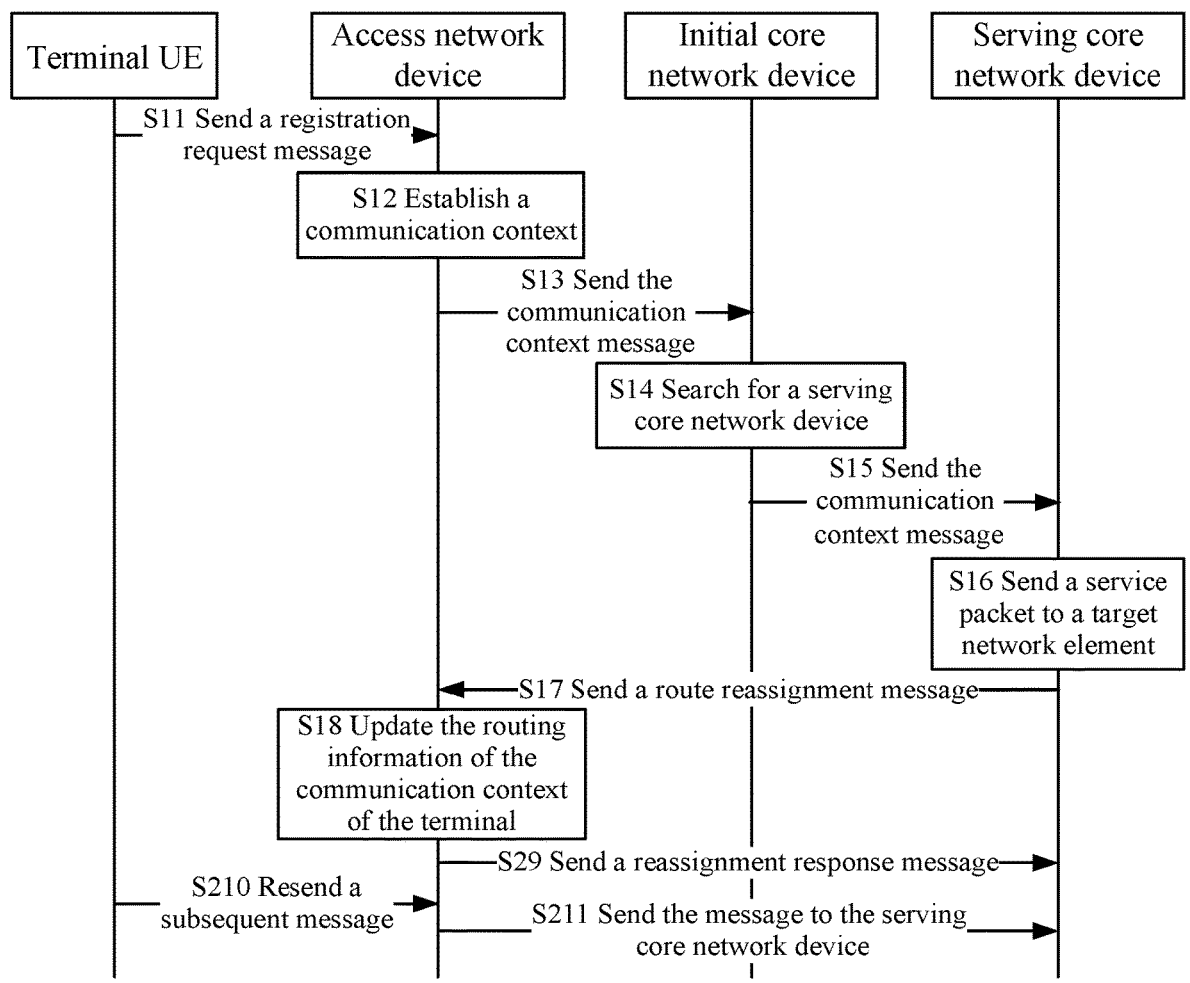
FIG. 8 is a flowchart of a routing selection method according to embodiment two of the present application.

As shown in FIG. 8, the difference between this example and example one lies in that step S29 is performed after step S18.

In step S29, the base station sends a reassignment response message to the serving core network device.

The response message sent by the base station to the serving core network device is an interface message defined by a standard, such as an NG interface message of 5G or an S1 interface message of 4G.

After receiving the message, the serving core network can confirm that the base station has modified the route of the terminal.

The response message includes one or a combination of the identifier (AMF name) of the initial core network device or the AMF pool information of the initial core network device; the identifier (AMF name) of the serving core network device or the AMF pool information of the serving core network device; the address information of the initial core network device, for example, an SCTP coupling address or an IP address for connection to the base station; the address information of the serving core network device, for example, an SCTP coupling address or an IP address for connection to the base station; the context identifier of the UE at the initial core network device, for example, initial AMF UE NGAP ID; the context identifier of the UE at the serving core network device, for example, serving AMF UE NGAP ID; the context identifier assigned by the base station to the UE, for example, RAN UE NGAP ID; operator information, for example, PLMN information; a routing information modification indication or a routing information modification failure indication; or a routing failure reason.

Step S210 and step S211 are the same as step S19 and step S110 in example one.

Example Three

Figure 9:
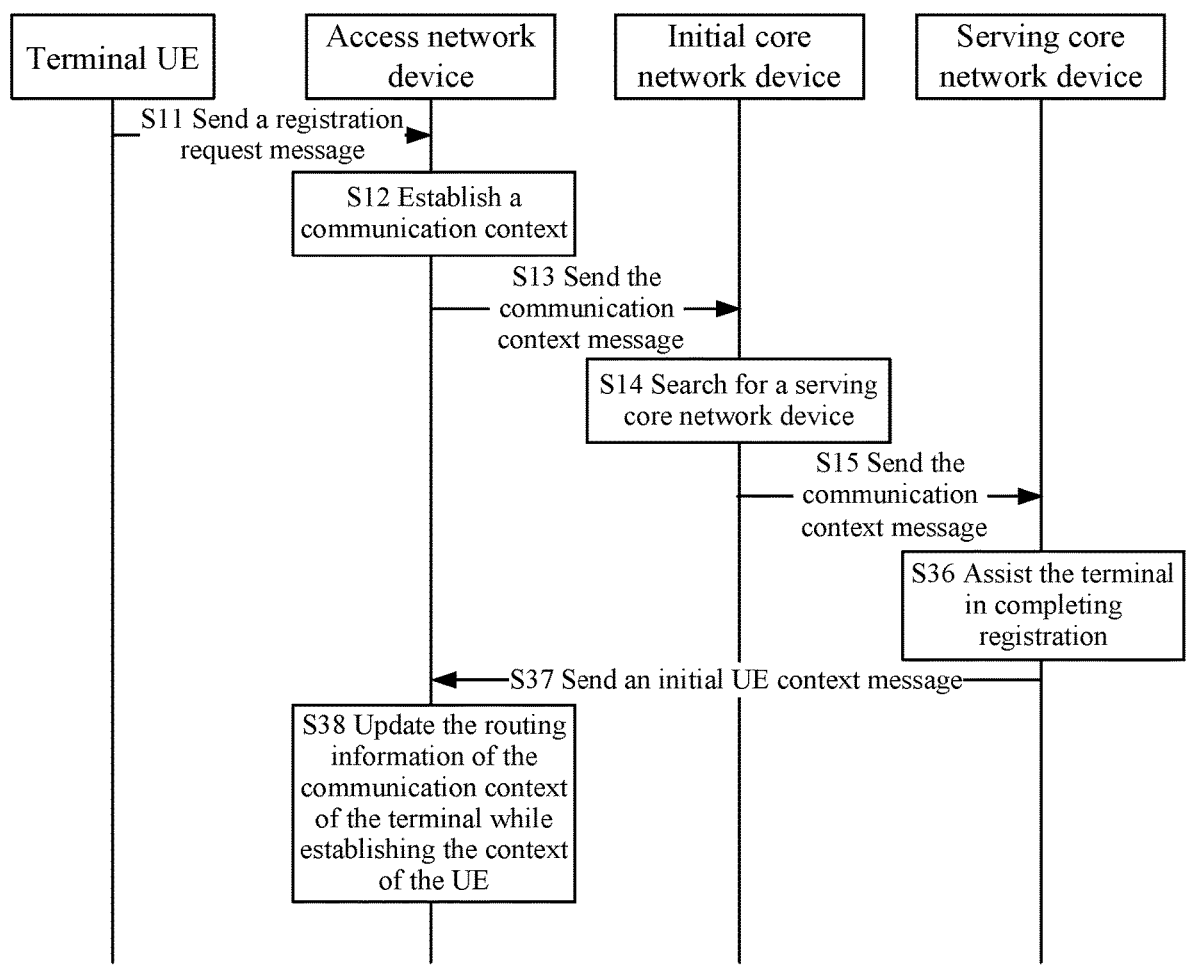
FIG. 9 is a flowchart of a routing selection method according to embodiment three of the present application.

As shown in FIG. 9, the difference between this example and examples one and two lies in that steps S36 to S38 are performed after step S15.

In step S11, the UE sends a registration request message to the base station.

In step 12, the base station establishes a communication context.

In step S13, the base station sends the communication context message to the initial core network device.

In step S14, the initial core network device searches for a serving core network device.

In step S15, the initial core network device sends the communication context message to the serving core network device.

In step S36, the serving core network device assists the terminal in completing registration.

Update of routing information of the communication context of the base station is not triggered during registration.

In step S37, the serving core network device sends an initial UE context message to the base station.

After authentication and other processes are completed, the core network sends the initial UE context message to the base station according to 3GPP TS23.401 or TS23.501 to request establishment of the context of the UE.

In this example, the message is required to carry route reassignment information. The route reassignment information is one or a combination of the identifier (AMF name) of the initial core network device or the AMF pool information of the initial core network device; the identifier (AMF name) of the serving core network device or the AMF pool information of the serving core network device; the address information of the initial core network device, for example, an SCTP coupling address or an IP address for connection to the base station; the address information of the serving core network device, for example, an SCTP coupling address or an IP address for connection to the base station; the context identifier of the UE at the initial core network device, for example, initial AMF UE NGAP ID; the context identifier of the UE at the serving core network device, for example, serving AMF UE NGAP ID; the context identifier assigned by the base station to the UE, for example, RAN UE NGAP ID; network slice information, for example, S-NSSAI list and/or allowed NSSAI; or operator information, for example, PLMN information.

In step S38, the base station updates the routing information of the communication context of the terminal while establishing the context of the UE.

According to the description of the related art, referring to 3GPP TS36.300, after the initial UE context message is received, the context of the UE is established.

In the present application, the routing information such as AMF name is modified at this point.

Example Four

Figure 10:
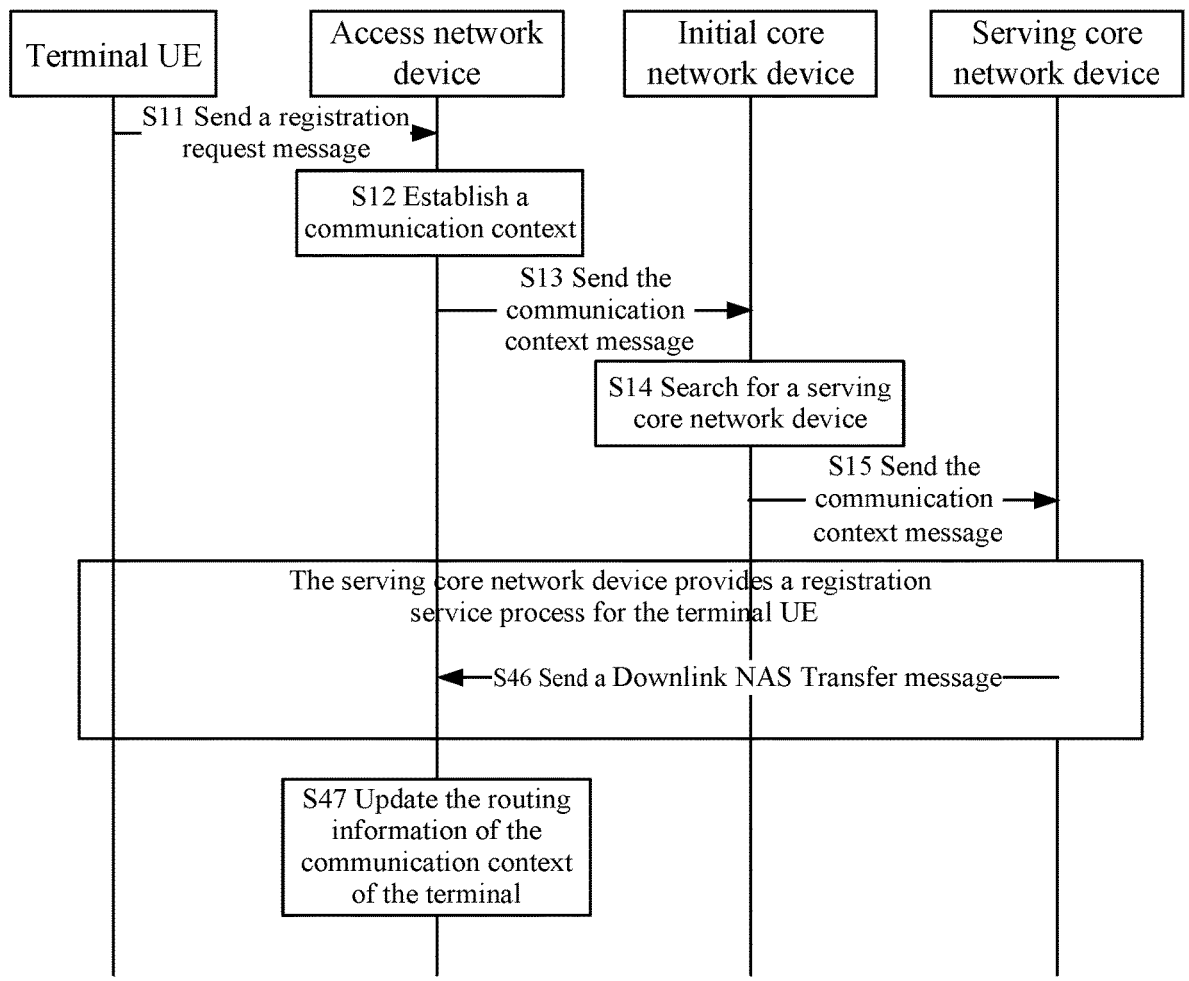
FIG. 10 is a flowchart of a routing selection method according to embodiment four of the present application.

As shown in FIG. 10, the difference between this example and examples one and two lies in that steps S46 to S47 are performed after step S15.

In step S46, the serving core network sends a Downlink Network Attached Storage Transfer (Downlink NAS Transfer) message carrying the route reassignment information.

According to the description of the related art, for example, 3GPP TS23.401 or TS23.501, after receiving the registration request of the terminal in step S5, the serving core network starts the registration process.

In the registration process, an authentication message needs to be sent to the terminal. The message may be carried to the base station through a message at the standardized interface NG interface or S1 interface and then sent to the terminal. Such a message may be, for example, the Downlink NAS Transfer message. In the present application, the route reassignment information is added to the message.

In step S47, the base station updates the routing information of the communication context of the terminal.

After receiving the message of step 46, the base station updates the routing information of the communication context of the terminal according to the route reassignment information.

We claim:

1. A routing selection method, comprising:
   receiving, by an access network device from a serving core network device, a route reassignment message to reroute communication from an initial core network device to the serving core network device, wherein the route reassignment message comprises:
   an access and mobility management function (AMF) name of the initial core network device;
   a context identifier assigned for a terminal by the access network device;
   a context identifier assigned for the terminal by the serving core network device; and
   an allowed Network Slice Selection Assistance Information (NSSAI); and
   updating, by the access network device, routing information of the terminal according to the route reassignment message.

2. The method of claim 1, wherein the route reassignment message comprises a transfer message.

3. The method of claim 1, wherein the route reassignment message comprises an initial user equipment (UE) context message.

4. The routing selection method of claim 1, wherein the initial core network device is different from the serving core network device.

5. An access network device, comprising:
   a receiver to receive from a serving core network device, a route reassignment message to reroute communication from an initial core network device to the serving core network device, wherein the route reassignment message comprises:
   an access and mobility management function (AMF) name of the initial core network device;
   a context identifier assigned for a terminal by the access network device;
   a context identifier assigned for the terminal by the serving core network device; and
   an allowed Network Slice Selection Assistance Information (NSSAI); and
   an updater to update routing information of the terminal according to the route reassignment message.

6. The access network device of claim 5, wherein the route reassignment message comprises a transfer message.

7. The access network device of claim 5, wherein the route reassignment message comprises an initial user equipment (UE) context message.

8. The access network device of claim 5, wherein the initial core network device is different from the serving core network device.

9. A non-transitory computer readable medium storing a program, which executed at an access network device, causes the access network device to perform:
   receiving, from a serving core network device, a route reassignment message to reroute communication from an initial core network device to the serving core network device, wherein the route reassignment message comprises:
   an access and mobility management function (AMF) name of the initial core network device;
   a context identifier assigned for a terminal by the access network device;
   a context identifier assigned for the terminal by the serving core network device; and
   an allowed Network Slice Selection Assistance Information (NSSAI); and
   updating routing information of the terminal according to the route reassignment message.

10. The non-transitory computer readable medium of claim 9, wherein the route reassignment message comprises a transfer message.

11. The non-transitory computer readable medium of claim 9, wherein the route reassignment message comprises an initial user equipment (UE) context message.

12. The non-transitory computer readable medium of claim 9, wherein the initial core network device is different from the serving core network device.

* * * * *